United States Patent
Li et al.

(10) Patent No.: US 11,903,073 B2
(45) Date of Patent: Feb. 13, 2024

(54) DYNAMIC ADJUSTMENT METHOD AND APPARATUS FOR PDU SESSION

(71) Applicant: Huawei Technologies Co., Ltd., Shenzhen (CN)

(72) Inventors: Xiaojuan Li, Beijing (CN); Guowei Ouyang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 361 days.

(21) Appl. No.: 17/289,085

(22) PCT Filed: Nov. 1, 2019

(86) PCT No.: PCT/CN2019/114929
§ 371 (c)(1),
(2) Date: Apr. 27, 2021

(87) PCT Pub. No.: WO2020/088626
PCT Pub. Date: May 7, 2020

(65) Prior Publication Data
US 2022/0007450 A1    Jan. 6, 2022

(30) Foreign Application Priority Data

Nov. 1, 2018 (CN) .................. 201811293709.X
Dec. 21, 2018 (CN) .................. 201811572623.0

(51) Int. Cl.
*H04W 76/22* (2018.01)
*H04W 76/18* (2018.01)
(Continued)

(52) U.S. Cl.
CPC .......... *H04W 76/22* (2018.02); *H04W 24/08* (2013.01); *H04W 24/10* (2013.01); *H04W 48/16* (2013.01);
(Continued)

(58) Field of Classification Search
CPC ..... H04W 76/22; H04W 24/08; H04W 24/10; H04W 48/16; H04W 76/11; H04W 76/18; H04W 76/30; H04W 76/32
See application file for complete search history.

(56) References Cited

U.S. PATENT DOCUMENTS

2015/0201345 A1   7/2015  Zhang et al.
2017/0359749 A1  12/2017  Dao et al.
(Continued)

FOREIGN PATENT DOCUMENTS

CN    103907370 A    7/2014
CN    107919969 A    4/2018
(Continued)

OTHER PUBLICATIONS

3GPP TR 23.791 V1.0.0 "3rd Generation Partnership Project; Technical Specification Group Services and System Aspects; Study of Enablers for Network Automation for5G (Release 16)," Sep. 2018, XP051475227, 66 pages.
(Continued)

*Primary Examiner* — Rina C Pancholi
(74) *Attorney, Agent, or Firm* — Conley Rose, P.C.

(57) ABSTRACT

A method for a protocol data unit (PDU) session includes a step of a first core network device obtaining a first message from a first server. The first core network device generates a first parameter based on the first message. A terminal device obtains a measurement result based on the first parameter and sends the measurement result to the first core network device. The first core network device obtains a second parameter based on the measurement result, and the second core network device configures the second parameter to dynamically adjust the PDU session based on location or time information with reference to the second parameter.

20 Claims, 13 Drawing Sheets

(51) Int. Cl.
*H04W 76/30* (2018.01)
*H04W 76/11* (2018.01)
*H04W 24/08* (2009.01)
*H04W 24/10* (2009.01)
*H04W 48/16* (2009.01)

(52) U.S. Cl.
CPC ............ *H04W 76/11* (2018.02); *H04W 76/18* (2018.02); *H04W 76/30* (2018.02)

(56) References Cited

U.S. PATENT DOCUMENTS

| | | | |
|---|---|---|---|
| 2018/0262924 A1* | 9/2018 | Dao ..................... | H04W 24/02 |
| 2018/0270712 A1 | 9/2018 | Faccin et al. | |
| 2018/0324663 A1* | 11/2018 | Park ..................... | H04W 36/22 |
| 2019/0174405 A1 | 6/2019 | Yang et al. | |
| 2019/0335366 A1 | 10/2019 | Jin et al. | |
| 2019/0357118 A1 | 11/2019 | Kim et al. | |

FOREIGN PATENT DOCUMENTS

| | | |
|---|---|---|
| CN | 108323245 A | 7/2018 |
| CN | 108616995 A | 10/2018 |
| CN | 108668381 A | 10/2018 |
| CN | 108684073 A | 10/2018 |
| KR | 20170119296 A | 10/2017 |
| WO | 2014047832 A1 | 4/2014 |
| WO | 2018059447 A1 | 4/2018 |
| WO | 2018131970 A1 | 7/2018 |

OTHER PUBLICATIONS

S-188266, Huawei et al., "Solution for Key Issue 4 to help OAM perform Slice Resource Adjustment," SA WG2 Meeting #128bis, Aug. 20-24, 2018, Sophia Antipolis, France, XP051537182, 6 pages.

* cited by examiner

DYNAMIC ADJUSTMENT METHOD AND APPARATUS FOR PDU SESSION

CROSS-REFERENCE TO RELATED APPLICATIONS

This application is a U.S. National Stage of International Patent Application No. PCT/CN2019/114929 filed on Nov. 1, 2019, which claims priority to Chinese Patent Application No. 201811572623.0 filed on Dec. 21, 2018 and Chinese Patent Application No. 201811293709.X filed on Nov. 1, 2018. All of the aforementioned patent applications are hereby incorporated by reference in their entireties.

TECHNICAL FIELD

This application relates to the field of communications technologies, and in particular, to network resource utilization of a PDU session.

BACKGROUND

In 5th generation mobile communications systems (5th generation mobile networks, 5G), network resource allocation is performed by a terminal device as a basic unit. Currently, a plurality of applications, such as a social application, a game application, and a video application, may be installed in a terminal device. For example, in a game application, a larger quantity of terminal devices in a location area access a 5G network, which increases the 5G network load in the location area. In addition, when a large-scale performance or event is held in a time and area, a large quantity of terminal devices may access the network, which increases the network load.

For the foregoing applications, if a user purchases a priority service, if the user cannot obtain a good network resource, user experience is poor.

SUMMARY

According to a dynamic adjustment method for a PDU session provided in this application, some specific applications or terminal devices can better use network resources based on a location or time, thereby improving efficiency.

According to a first aspect, this application provides a dynamic adjustment method for a protocol data unit PDU session, including: A first core network device obtains a first message sent by a first server, and the first core network device generates a first parameter based on the first message. The first core network device sends a second message to a second core network device, where the second message carries first indication information, and the first indication information is used to indicate a terminal device to collect statistics on a measurement result of the first parameter. The first core network device obtains the measurement result of the first parameter and obtains a second parameter through statistics collection, the first core network device sends the second parameter to the second core network device, and the second core network device configure the second parameter, to dynamically adjust the PDU session.

Through the foregoing method, the second parameter related to the PDU session can be obtained based on the measurement result. The second parameter indicates that more parameters are used when the terminal device accesses a network. The PDU session is dynamically adjusted based on the second parameter, so that the terminal device can better use a network resource or access a network.

In a first possible implementation, the first core network device sends a third message to the second core network device, where the third message carries the second parameter, and the second core network device configures the second parameter based on the third message.

With reference to the first possible implementation of the first aspect, in a second possible implementation, when the first message is used to indicate a network resource status of a first slice, the first core network device sends a fourth message to the second core network device, where the fourth message carries at least one of first slice information and a first lime period. Generally, the first slice information may be an identifier indicating the first slice, and the first time period information may be a time point or a time period.

With reference to the first possible implementation of the first aspect, in a third possible implementation, when the first message is used to indicate a network resource status of a first application, the first core network device sends a fifth message to a third core network device, where the fifth message carries at least one of a first application identifier and a second time period.

According to a second aspect. This application provides a dynamic adjustment method for a protocol data unit PDU session, including: A second ewe network device obtains a second message sent by a first core network device, and sends the second message to a terminal device, where the second message carries a first parameter, and is used to indicate the terminal device to collect statistics on a measurement result of the first parameter. The second core network device obtains the measurement result sent by the terminal device, and sends the measurement result to the first core network device. The second core network obtains a third message, where the third message is used to indicate the second core network device to configure a second parameter.

In addition, in a possible implementation, the second core network device may obtain the measurement result from the first core network device, and the second core network device obtains the first parameter based on the measurement result, and sends the first parameter to the terminal device.

With reference to the second aspect, in a first possible implementation, when the first message is used to indicate a network resource status of a first slice, the second core network device obtains a fourth message and performs a first operation, where the fourth message carries at least one of first slice information and a first time period.

With reference to the first possible implementation of the second aspect, in a second possible implementation, the PDU session exists, and the first operation includes: The second core network device determines, based on the fourth message, that the PDU session belongs to the first slice, and retains the PDU session; or the second core network device determines, based on the fourth message, that the PDU session does not belong to the first slice, and releases the PDU session.

With reference to the second possible implementation of the second aspect in a third possible implementation, when a new PDU session needs to be established, the second core network device obtains a PDU session establishment request sent by the terminal device. When the second core network device determines, based on the first slice information, that the PDU session belongs to the first slice, the second core network device sends a PDU session reception request message to the terminal device.

The second core network device determines, based on the first slice information, that the PDU session does not belong to the first slice: and the second core network device sends a PDU session rejection request message to the terminal device, where the rejection request message carries a first cause value and first time information, the first cause value is used to indicate a cause for rejecting the PDU session, and the first time information is used to indicate a time at which a PDU session is established next time.

With reference to the second aspect, in a fourth possible implementation, when the first message is used to indicate a network resource status of a first application, the second core network device obtains a fifth message sent by a third core network device. The fifth message carries at least one of a first application identifier and a second time period.

With reference to the fourth possible implementation of the second aspect, in a fifth possible implementation, the PDU session exists, and the second core network device performs a second operation, including: The second core network device determines, based on the fifth message, that the PDU session carries the first application identifier, and retains the PDU session; or the second core network device determines, based on the fifth message, that the PDU session does not carry the first application identifier, and releases the PDU session.

According to a third aspect, this application provides a dynamic adjustment method for a protocol data unit PDU session, including: A terminal device obtains a second message sent by a second core network device, where the second message carries a first parameter, and is used to indicate the terminal device to collect statistics on a measurement result of the first parameter. The terminal device sends the measurement result of the first parameter to the second core network device.

With reference to the third aspect, in a first possible implementation, a first message is used to indicate a network resource status of a first application, and the terminal device obtains a fifth message sent by the second core network device, where the fifth message carries at least one of first application information and a second lime period.

With reference to the first possible implementation of the third aspect, in a second possible implementation, the first application transmits data and the PDU session exists, the terminal device performs a third operation, including: The terminal device determines, based on the fifth message, that the PDU session matches a first application identifier; and the terminal device sends a PDU session modification request message to the second core network device, where the PDU session request message carries the first application identifier.

With reference to the first possible implementation of the third aspect, in a third possible implementation, the first application transmits data and the PDU session does not exist, and the terminal device performs a fifth operation, including: The terminal device sends a PDU session establishment request message to the second core network device, where the PDU session establishment request message carries a first application identifier.

According to a fourth aspect, this application provides a first core network device in a dynamic adjustment method for a data protocol unit PDU session, including: an obtaining unit configured to obtain a first message sent by a first server and a first parameter obtained based on the first message; and a sending unit, configured to send a second message to a second core network device, where the second message carries first indication information, and the first indication information is used to indicate a terminal device to collect statistics on a measurement result of the first parameter. The obtaining unit is further configured to obtain the measurement result of the first parameter.

With reference to the fourth aspect, in a first possible implementation, the sending unit is further configured to send a third message to the second core network device, where the third message carries a second parameter, and the third message is used to indicate the second core network device to configure the second parameter.

With reference to the first possible implementation of the fourth aspect in a second possible implementation, when the first message is used to indicate a network resource status of a first slice, the sending unit is further configured to send a fourth message to the second core network device, where the fourth message carries at least one of first slice information and a first time period.

With reference to the first possible implementation of the fourth aspect, in a third possible implementation, when the first message is used to indicate a network resource status of a first application, the sending unit is further configured to send a fifth message to a third core network device, where the fifth message carries at least one of a first application identifier and a second lime period.

According to a fifth aspect, this application provides a second core network device in a dynamic adjustment method for a protocol data unit PDU session, including: an obtaining unit, configured to obtain a second message sent by a first core network device, where the second message carries a first parameter, and is used to indicate a terminal device to collect statistics on a measurement result of the first parameter, and further configured to obtain the measurement result sent by the terminal device: and a sending unit, configured to send the second message to the terminal device and send the measurement result to the first core network device. The obtaining unit is further configured to obtain a third message, where the third message is used to indicate the second core network device to configure a second parameter.

With reference to the fifth aspect, in a first possible implementation, the first message is used to indicate a network resource status of a first slice, the obtaining unit is further configured to obtain a fourth message, where the fourth message carries at least one of first slice information and a first lime period, and a processing unit performs a first operation based on the fourth message.

With reference to the first possible implementation of the fifth aspect, in a second possible implementation, the PDU session exists, and the first operation includes: The processing unit determines, based on the fourth message, that the PDU session belongs to the first slice, and retains the PDU session, or the processing unit determines, based on the fourth message, that the PDU session does not belong to the first slice, and releases the PDU session.

With reference to the first possible implementation of the fifth aspect, in a third possible implementation, a new PDU session is established, the obtaining unit is configured to obtain a PDU session establishment request sent by the terminal device, the processing unit is configured to determine, based on the first slice information, that the PDU session belongs to the first slice, and the sending unit is configured to send a PDU session reception request message to the terminal device.

Further, the processing unit is configured to determine, based on the first slice information, that the PDU session does not belong to the first slice, and the sending unit is configured to send a PDU session rejection request message to the terminal device, where the rejection request message carries a first cause value and first time information, the first cause value is used to indicate a cause for rejecting the PDU session, and the first time information is used to indicate a time at which a PDU session is established next time.

With reference to the fifth aspect, in a fourth possible implementation, the first message is used to indicate a network resource status of a first application, the obtaining unit is configured to obtain a fifth message sent by a third core network device, where the fifth message carries at least one of a first application identifier and a second time period, and the processing unit is configured to perform a second operation.

With inference to the fourth possible implementation of the fifth aspect, in a fifth possible implementation, the PDU session exists, and the second operation includes: the processing unit determines, based on the fifth message, that the PDU session carries the first application identifier, and retains the PDU session: and the processing unit determines, based on the fifth message, that the PDU session does not carry the first application identifier, and releases the PDU session.

According to a sixth aspect, this application provides a terminal device in a dynamic adjustment method for a protocol data unit PDU session, including an obtaining unit, configured to obtain a second message sent by a second core network device, where the second message carries a first parameter and is used to indicate the terminal device to collect statistics on a measurement result of the first parameter: and a sending unit configured to send the measurement result of the first parameter to the second core network device.

With reference to the sixth aspect, in a first possible implementation, the first message is used to indicate a network resource status of a first application, the obtaining unit is configured to obtain a fifth message sent by the second core network device, where the fifth message carries at least one of first application information and a second time period, and a processing unit is configured to perform a third operation.

With reference to the first possible implementation of the sixth aspect, in a second possible implementation, the first application transmits data and the PDU session exists, and the third operation includes: The processing unit determines, based on the fifth message, that the PDU session matches a first application identifier, and the sending unit sends a PDU session modification request message to the second core network device, where the PDU session request message carries the first application identifier.

With reference to the first possible implementation of the sixth aspect, in a third possible implementation, the first application transmits data and the PDU session does not exist, and the sending unit sends a PDU session establishment request message to the second core network device, where the PDU session establishment request message carries a first application identifier.

According to a seventh aspect, this application provides an apparatus in a dynamic adjustment method for a data protocol unit PDU session, where the apparatus is a first core network device, including: a receiver, configured to obtain a first message sent by a first server and a first parameter obtained based on the first message; and a transmitter, configured to send a second message to a second core network device, where the second message carries first indication information, and the first indication information is used to indicate a terminal device to collect statistics on a measurement result of the first parameter. The receiver is further configured to obtain the measurement result of the first parameter.

With reference to the seventh aspect, in a first possible implementation, the transmitter is further configured to send a third message to the second core network device, where the third message carries a second parameter, and the third message is used to indicate the second core network device to configure the second parameter.

With reference to the first possible implementation of the seventh aspect, in a second possible implementation, when the first message is used to indicate a network resource status of a first slice, the transmitter is further configured to send a fourth message to the second core network device, where the fourth message carries at least one of first slice information and a first time period.

With reference to the first possible implementation of the seventh aspect, in a third possible implementation, when the first message is used to indicate a network resource status of a first application, the transmitter is further configured to send a fifth message to a third core network device, where the fifth message carries at least one of a first application identifier and a second time period.

According to an eighth aspect, this application provides an apparatus in a dynamic adjustment method for a protocol data unit PDU session, where the apparatus is a second core network device, including: a receiver, configured to obtain a second message sent by a first core network device, where the second message carries a first parameter, and is used to indicate a terminal device to collect statistics on a measurement result of the first parameter, and further configured to obtain the measurement result sent by the terminal device; and a transmitter, configured to send the second message to the terminal device and send the measurement result to the first core network device, where the receiver is further configured to obtain a third message. The third message is used to indicate the second core network device to configure a second parameter.

With reference to the eighth aspect, in a first possible implementation, the first message is used to indicate a network resource status of a first slice, the receiver is further configured to obtain a fourth message, where the fourth message carries at least one of the first slice information and a first time period, and a processor performs a first operation based on the fourth message.

With reference to the first possible implementation of the eighth aspect, in a second possible implementation, the PDU session exists, and the first operation includes: The processor determines, based on the fourth message, that the PDU session belongs to the first slice, and retains the PDU session: and the processor determines, based on the fourth message, that the PDU session does not belong to the first slice, and releases the PDU session.

With reference to the first possible implementation of the sixth aspect, in a third possible implementation, a new PDU session is established, the receiver is configured to obtain a PDU session establishment request sent by the terminal device, the processor is configured to determine, based on the first slice information, that the PDU session belongs to the first slice, and the transmitter is configured to send a PDU session reception request message to the terminal device.

Further, the processor is configured to determine that the PDU session does not belong to the first slice, and the transmitter is configured to send a PDU session rejection request message to the terminal device, where the rejection request message carries a first cause value and first time information, the first cause value is used to indicate a cause for rejecting the PDU session, and the first time information is used to indicate a time at which a PDU session is established next time.

With reference to the eighth aspect, in a fourth possible implementation, the first message is used to indicate a network resource status of a first application, the receiver is configured to obtain a fifth message sent by a third core network device, where the fifth message carries at least one of a first application identifier and a second time period, and the processor is configured to perform a second operation.

With reference to the fourth possible implementation of the sixth aspect, in a fifth possible implementation, the PDU session exists, and the second operation includes: The processor determines, based on the fifth message, that the PDU session carries a first application identifier, and retains the PDU session; and the processor determines, based on the fifth message, that the PDU session does not carry the first application identifier, and releases the PDU session.

According to a ninth aspect, this application provides an apparatus in a dynamic adjustment method for a protocol data unit PDU session, where the apparatus is a terminal device, including: a receiver, configured to obtain a second message sent by a second core network device, where the second message carries a first parameter, and is used to indicate the terminal device to collect statistics on a measurement result of the first parameter, and a transmitter, configured to send the measurement result of the first parameter to the second core network device.

With reference to the ninth aspect, in a first possible implementation, the first message is used to indicate a network resource status of a first application, the receiver is configured to obtain a fifth message sent by the second core network device, where the fifth message carries at least one of first application information and a second time period, and the processor is configured to perform a third operation.

With reference to the first possible implementation of the ninth aspect, in a second possible implementation, the first application transmits data and the PDU session exists, and the third operation includes: The processor determines, based on the fifth message, that the PDU session matches a first application identifier: and the transmitter sends a PDU session modification request message to the second core network device, where the PDU session request message carries the first application identifier.

With reference to the first possible implementation of the ninth aspect, in a second possible implementation, the first application transmits data and the PDU session does not exist, and the third operation includes: The transmitter sends a PDU session establishment request message to the second core network device, where the PDU session establishment request message carries the first application identifier.

By implementing the foregoing embodiments provided in this application, the terminal device can dynamically adjust the PDU session based on time information or location information, to ensure that the terminal device can better access a network or use a network resource.

DESCRIPTION OF EMBODIMENTS

Figure 1:
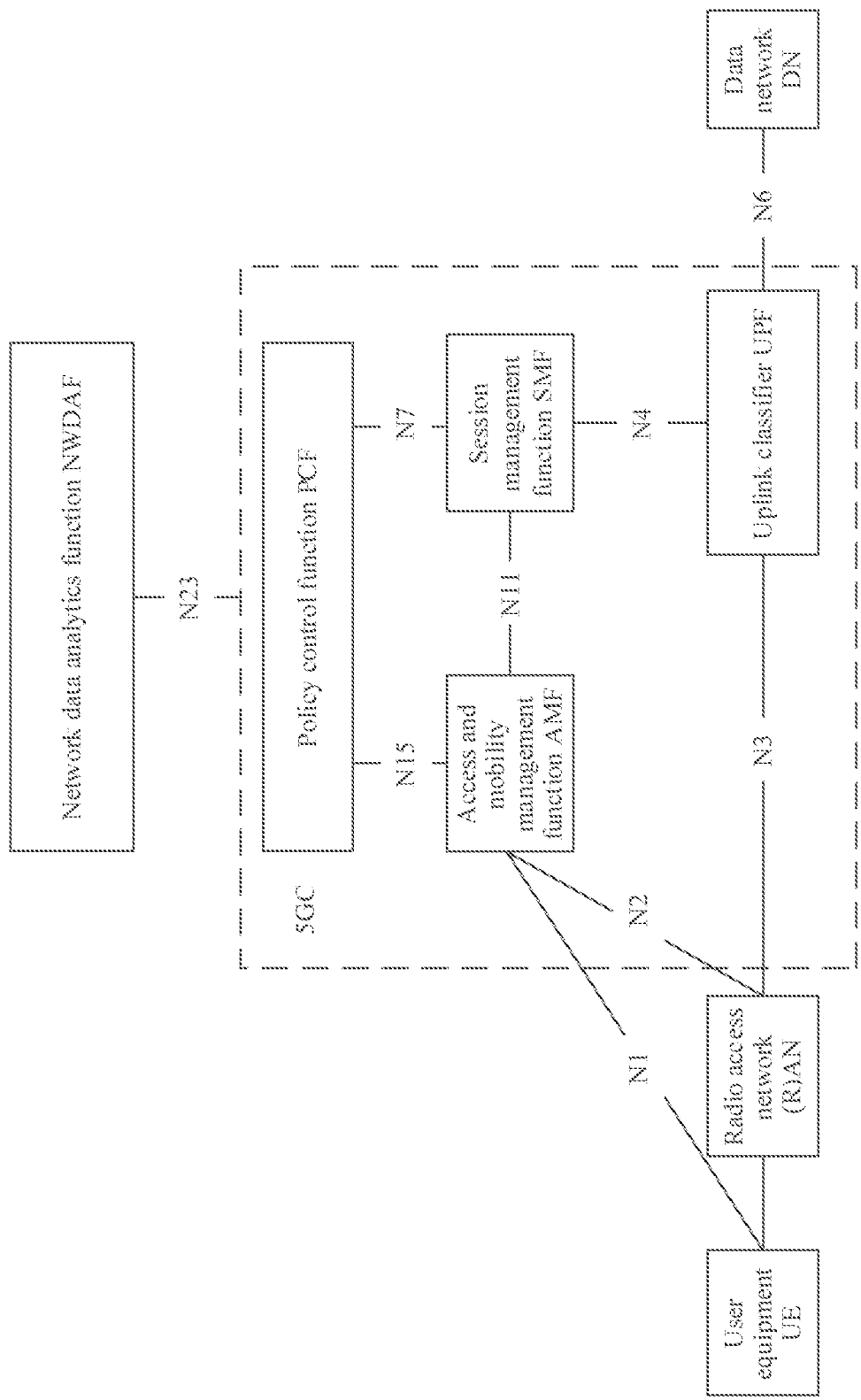
FIG. 1 is a schematic diagram of a 5G mobile communications network system according to an embodiment of this application.

To make the objectives, technical solutions, and advantages of this application clearer, the following further describes embodiments of this application in detail with reference to the accompanying drawings. To understand this application comprehensively, the following detailed description mentions many specific details. However, a person skilled in the art should understand that this application may be implemented without these specific details. In other embodiments, well-known methods, processes, components, and circuits are not described in detail, to prevent the embodiments from being blurred. It is clear that, live embodiments in the following description are some but not all of the embodiments of this application. All other embodiments obtained by a person of ordinary skill in the art based on the embodiments of this application without creative efforts shall fall within the protection scope of this application.

Some procedures described below include a plurality of operations that appear in a specific sequence. However, it should be clearly understood that these operations may not be performed in a sequence that appears in this specification or may be performed in parallel. Sequence numbers of operations, such as 101 and 102, are merely used to distinguish different operations, and the sequence numbers themselves do not represent any execution sequence. In addition, these procedures may include more or fewer operations, and these operations may be performed sequentially or in parallel.

It should be noted that descriptions such as "first" and "second" in this specification are used to distinguish different messages, devices, modules, and the like, do not represent a sequence, and do not limit "first" and "second" to different types, "ft" in the specification represents that a condition and a state are met, and includes meanings, such as "when", "after a condition is met", or "determining succeeds", "Message" is a carrier carrying several pieces of information, including a plurality of forms such as signaling, communication signals, and data messages.

The technical solutions of the embodiments of this application may be applied to various communications systems, such as: a global system for mobile communication (Global System of Mobile Communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long term Evolution, LTE) system, an LTK frequency division duplex (Frequency Division Duplex, FDD) system, an LTE time division duplex (Time Division Duplex, TDD), a universal mobile telecommunications system (Universal Mobile Telecommunications System, UMTS), a worldwide interoperability for microwave access (Worldwide Interoperability for Microwave Access, WiMAX) communications system, a future 5th generation (5th Generation, 5G) system, or a new radio (New Radio, NR) system.

FIG. 1 is a schematic diagram of a system 100 applicable to the embodiments of this application. As shown in FIG. 1, the system 100 may specifically include an access and mobility management function (access and mobility management function, AMF) network element, a session management function (session management function, SMF) network element, a user plane function (user plane function, UPF) network element, a radio access network (radio access network RAN) device, and user equipment (user equipment, UE).

Optionally, the system 100 may further include one or more of a network repository function (network repository function, NRF) network element, an authentication server function (authentication server function, AUSF) network element, a unified data management (unified data management, UDM) network element, a policy control function (policy control function, a PCF) network element, and a data network (data network, DN).

The AMF network element is responsible for access and mobility management, and has functions such as authentication, switching, and location update for a user.

The NRF network element is responsible for storing a network function and service information, and supporting a discovery function of a service and a network function (that is, accepting a network function query request and providing information about a discovered network function). It should be understood that the NRF network element may interface with any other network element. This is not limited in the embodiments of this application, and therefore is not shown in FIG. 1.

The SMF network element is responsible for session management, including establishment, modification, release, and the like of a packet data unit (packet data unit, PDU) session.

The PCF network element is responsible for user policy management, including both a mobility-related policy and a PDU session-related policy, for example, a quality of service (qualify of service, QoS) policy and a charging policy.

The UPF network element is responsible for forwarding user data, where UPF is a user plane function.

The DN is an access destination of a PDU session of a user.

The UE communicates with the AMF through an N1 interface, and the UE may access a 5G network by using a RAN. As shown in FIG. 1, a 5GC (5G Core Network, 5GC) represents a 5G network. The RAN communicates with the AMF through an N2 interface, the RAN communicates with the UPF through an N3 interface, the UPF communicates with the SMF through an N4 interface, the UPF communicates with the DN through an N6 interface, the AMF communicates with the SMF through an N11 interface, the AMF communicates with the PCF through an N15 interface, and the SMF communicates with the PCF through an N7 interface.

It should be noted that in FIG. 1, only an example in which the terminal is UE is used for description. Nantes of interfaces between the network elements in FIG. 1 are merely examples. In specific implementation, interface names of the system 100 may alternatively be other names. This is not specifically limited in the embodiments of this application. In addition, the RAN device may also be referred to as an access network device, and the access network device refers to a device that accesses a core network.

The access network device is a device that accesses the mobile communications system by a terminal device in a wireless manner, and may be a base station (NodeB), an evolved base station (eNodeB), a base station (gNB) in a 5G mobile communications system, a base station in a future mobile communications system, an access node in a Wi-Fi system, or the like, or may be a radio controller in a cloud radio access network (cloud radio access network, CRAN) scenario. Alternatively, the access network device may be a relay station, an access point, a vehicle-mounted device, a wearable device, a network device in a future 5G network, a network device in a future evolved PLMN network, or the like. A specific technology and a specific device form used by the radio access network device are not limited in the embodiments of this application.

To better cope with complex specific scenarios, the concept of network slicing is introduced in the 5G mobile communications system. The network slicing enables network operators to provide specific services or customer-specific services for dedicated virtual networks on general network infrastructure. Therefore, it can support many different services envisaged by 5G.

Certainly, another network element, for example, a network slice selection function (network slice selection function, NSSF) network element, may be further deployed in the system 100. This is not specifically limited in the embodiments of this application.

The terminal (terminal) in the embodiments of this application may include various handheld devices, vehicle-mounted devices, wearable devices, computing devices, or other processing devices connected to a wireless modem that have a wireless communication function, and may further include a subscriber unit (subscriber unit), a cellular phone (cellular phone), a smartphone (smart phone), a wireless data card, and a personal digital assistant (personal digital assistant, PDA) computer, a tablet computer, a wireless modem (modem), a handheld device (handheld), a laptop computer (laptop computer), a cordless phone (cordless phone), or a wireless local loop (wireless local loop, WLL) station, a machine type communication (machine type communication, MTC) terminal, user equipment (user equipment, UE), a mobile station (mobile station, MS), a terminal device (terminal device), relay user equipment, or the like. The relay user equipment may be, for example, a 5G residential gateway (residential gateway, RG). For ease of description, the devices mentioned above are collectively referred to as a terminal device in this application.

Figure 2:
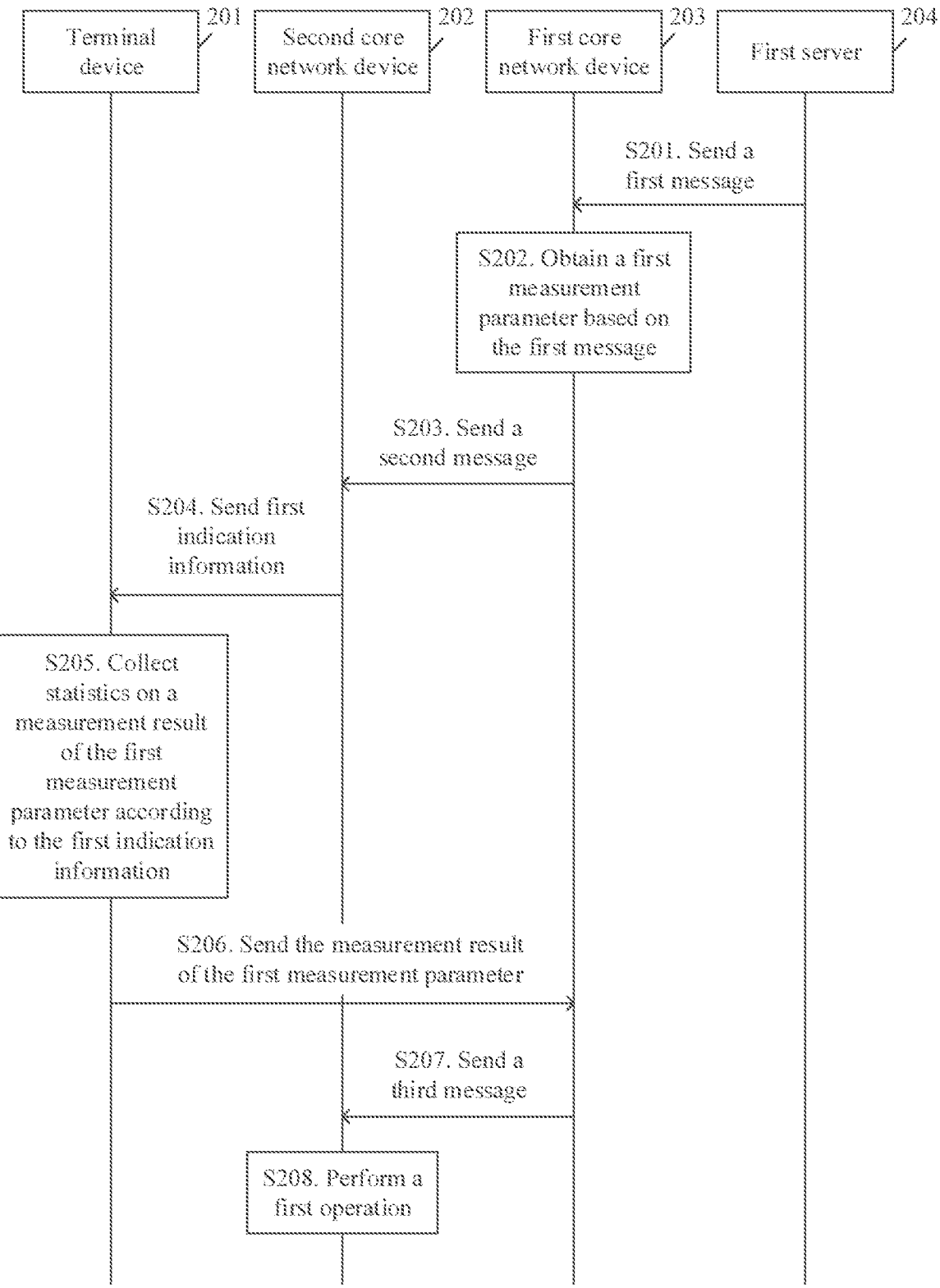
FIG. 2 is a schematic diagram of a dynamic adjustment method for a PDU session according to an embodiment of this application.

As shown in FIG. 2, this application provides an embodiment of a dynamic adjustment method for a PDU session. As shown in FIG. 2, the specific method is as follows:

S201: A first server 204 sends a first message to a first core network device 203.

Figure 4A:
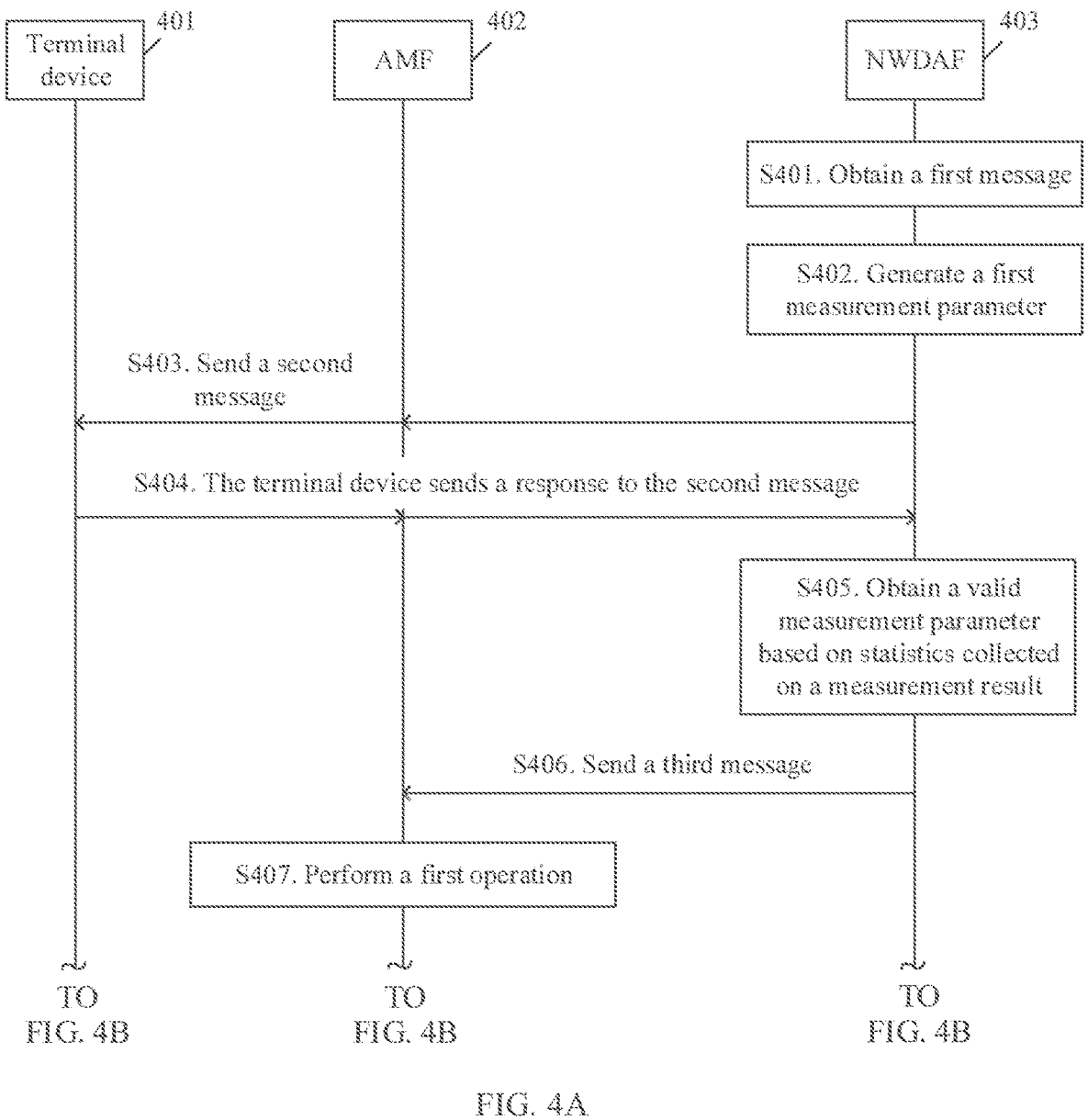
FIG. 4A and FIG. 4B are a schematic diagram of a network slice-based dynamic adjustment method for a PDU session according to an embodiment of this application.
Figure 4B:
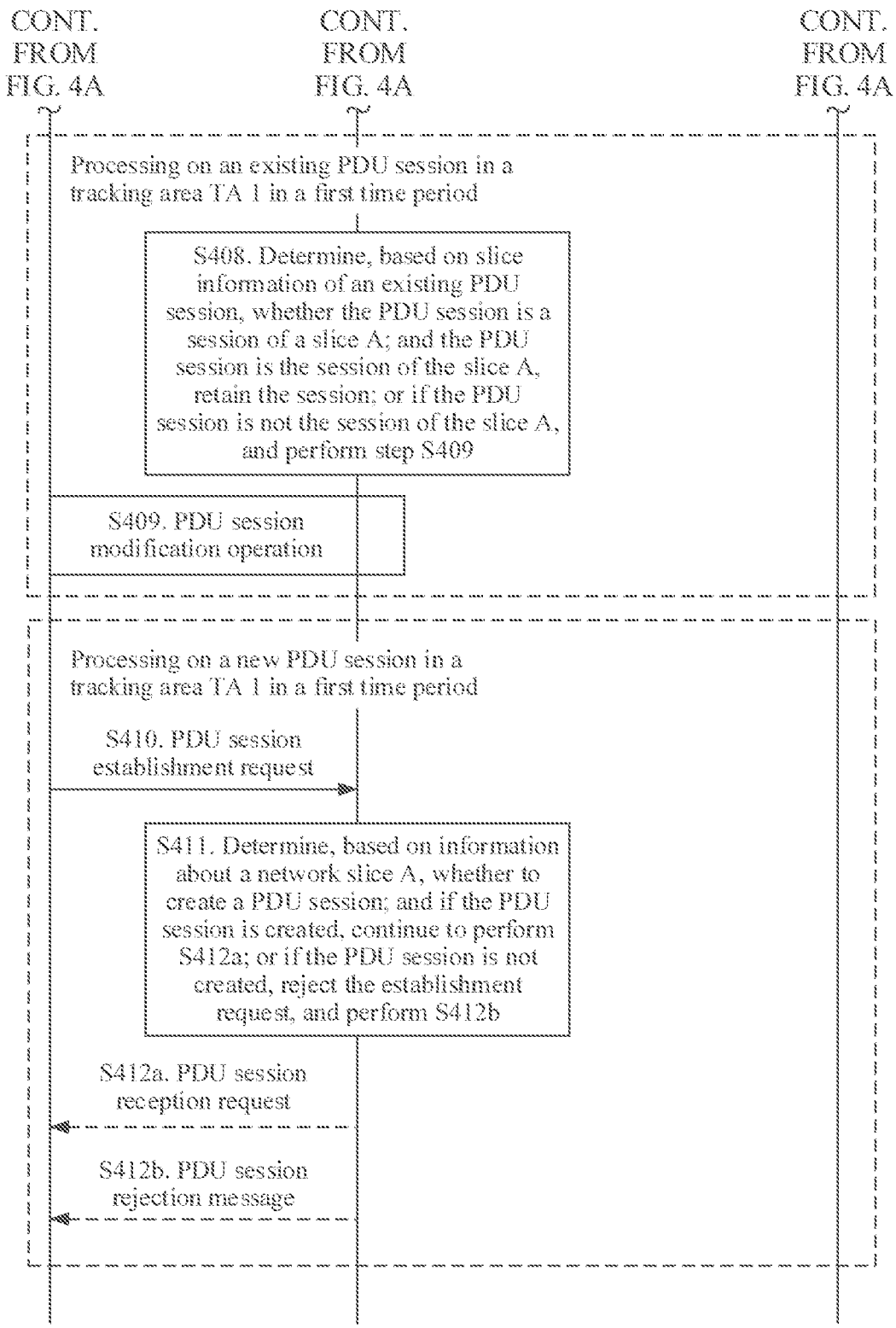

Specifically, the first server may be an application function (Application Function, AF) entity, or may be an application server. For example, if a terminal device is currently using an application "Weibo", an application server is an application server of the "Weibo". As shown in FIG. 4A and FIG. 4B, the first core network device is a network data analytics function (Network Data Analytics Function, NWDAF) entity. The first core network device obtains, from the first server, time information and location information that are frequently used by a network slice or an application, and dynamically adjusts a PDU session based on the obtained time information and location information, so that the terminal device can preferentially access a network, to obtain a high-quality network resource.

In step S201, the first message is used to indicate network resource information. When the first core network device 203 is an NWDAF, as shown in S401 in FIG. 4A and FIG. 4B, S401. The NWDAF 403 obtains a first message sent by an AF.

Optionally, the first message may be used to indicate network resource information of a network slice. For example, if a quantity of network slices A that the terminal device accesses in a current time period A or in a location area A exceeds a preset quantity, the first message is used to indicate that utilization of the network slice A is high when one or more conditions of the time period A and the location area A are met. Optionally, the first message may also be used to indicate network resource information of an application. For example, if a quantity of terminal devices accessed by an application B in a time period B or a location area B exceeds a preset quantity, the first message is used to indicate that the application B is frequently used when the application B meets one or more conditions of the time period B and the location area B, to ensure that the application B can preferentially access a network, to obtain a good network resource. Using a specific scenario as an example, in 24 hours, a frequency of using the application B is 100 times, and a time period unit is hour. A quantity of times of using the application B is 15 times from 19:00 to 20:00, and a quantity of times of using the application B in other time periods is less than 10 times. Therefore, a time period with a high frequency of using the application B in the time period from 19:00 to 20:00 is determined. In this case, the first message is used to indicate that the application B is frequently used when the application B is in the time period from 19:00 to 20:00.

S202. The first core network device 203 obtains a first parameter based on the first message.

In some embodiments, the first core network device 203 may obtain the first parameter by using a local mapping table (as shown in Table 1) based on network resource information that needs to be indicated by the first message. The local mapping table is stored in the first core network device. A specific form is not specifically limited in this application. The first parameter may include air interface measurement, a QoS-related parameter, and the like. For example, the QoS-related parameter may be a 5G QoS indicator (5G QoS indicator, 5QI), a reflective QoS attribute ROA (Reflective QoS Attribute, RQA), or the like.

TABLE 1

| Network resource information | Parameter |
|---|---|
| Network Slice A | 5QI |
| Network Slice B | RQA |
| Network slice C | Parameter X |

Specifically, in an embodiment as shown in FIG. 4A and FIG. 4B,

S402. The NWDAF 403 generates a first parameter based on the first message.

Specifically, based on the first message, the NWDAF determines, by using the local mapping table, that in the period from 19:00 to 20:00, to enable the network slice A to preferentially access the network, parameters that need to be used are the 5QI and the ROA. In this case, the 5QI is the first parameter.

S203. The first core network device 203 sends the second message to the second core network device 202.

In an embodiment, the second message carries first indication information, and the first indication information is used to indicate the terminal device to collect statistics on a measurement result of the first parameter.

Specifically, according to the foregoing embodiment, as shown in FIG. 4A and FIG. 4B, the second core network device 202 may be an access and mobility management function (Access and Mobility Management Function, AMF) entity. For example, in step S403, the first core network device NWDAF 403 sends the second message to the second core network device AMF 402. The first indication information carried in the second message is used to indicate the terminal device 401 to collect statistics on measurement results of the 5QI and the ROA.

Further, in another embodiment, the second message carries the first parameter 5QI and the ROA, and the second core network device 202 locally generates a first indication message based on the second message.

S204. The second core network device 202 sends the first indication information to the terminal device 201. The first indication information is the same as the description in step S203, and details are not described herein again. In some embodiments, after receiving the first indication information, the terminal device 201 sends a notification response to the second core network device 202. The second core network device 202 allows the terminal device 201 to send a measurement result to the second core network device 202 based on the notification response, where the notification response may carry the measurement result, or the measurement result may be sent by the terminal device 201 after the notification response is sent to the second core network device 202.

In another embodiment, after receiving the first indication message, the terminal device 201 may not send the notification response to the second core network device 202. When the terminal device 201 does not send the notification response to the second core network device 202, the terminal device 201 directly sends the measurement result to the second core network device 202.

Specifically, as shown in step S404 in FIG. 4A and FIG. 4B, the terminal device 401 sends a response to the second message to the NWDAF 403. The response to the second message is used by the AMF 402 to send, to the NWDAF 403, a measurement result obtained by the terminal device 401 based on the first measurement parameter first parameter carried in the second message.

In some embodiments, the terminal device 401 sends the response to the second message to the AMF 402, and then the AMF 402 sends the response to the second message to the NWDAF 403.

S205. The terminal device 201 collects statistics on the measurement result of the first parameter based on the first indication information. In an embodiment of this application, when the first parameter includes the 5QI, the terminal device 201 collects statistics on a quantity of times of using the 5QI when the terminal device accesses the network slice A in the time period A or in the location area A, and the quantity of times of using the 5QI obtained by the terminal device 201 through statistics collection is the measurement result of the first parameter of the terminal device 201.

S206. The terminal device 201 sends the measurement result of the first parameter to the second core network device 202.

Specifically, as shown in step S405 in FIG. 4A and FIG. 4B, the NWDAF 403 obtains a second parameter based on the measurement result of live first parameter. The first core network device NWDAF 403 performs big data analysis based on the received measurement result of the first parameter, to obtain the second parameter. For example, the first core network device 202 sets a threshold. When a quantity of times of using the measurement parameter in the measurement result reaches or exceeds the threshold set by the terminal device 201, the parameter may be determined as the second parameter.

For example, a total of 100 terminal devices are accessed in the network slice A, where two terminal devices use the ROA, and 50 terminal devices use the 5QI. In this case, the first core network device determines the 5QI as the second parameter.

S207. The first core network device sends a third message to the second core network device.

The third message carries the second parameter, and the third message indicates the second core network device to configure the second parameter.

Specifically, as shown in step S406 in FIG. 4A and FIG. 4B, the NWDAF 403 sends the third message to the AMF 402, where the third message carries the second parameter 5QI.

S208. The second core network device 202 configures the second parameter based on the third message. Specifically, the second core network device 202 dynamically adjusts modification or establishment of the PDU session based on the configured second parameter.

Specifically, as shown in step S407 in FIG. 4A and FIG. 4B, the AMF 402 configures the second parameter based on the third message.

For example, when the second core network device AMF 402 stores a QoS-related parameter 5QI 1, the second core network device AMF 402 determines, based on the third message, a QoS-related coefficient to be modified. In this case, the AMF replaces the QoS-related parameter 5QI 1 stored in the AMF with a QoS-related parameter 5QI in the second measurement parameter second parameter carried in the third message.

In some embodiments of this application, determining that the second core network device 202 stores the second measurement parameter is to process an existing PDU session or a new PDU session to ensure quality of service of a current network slice or application.

Figure 3A:
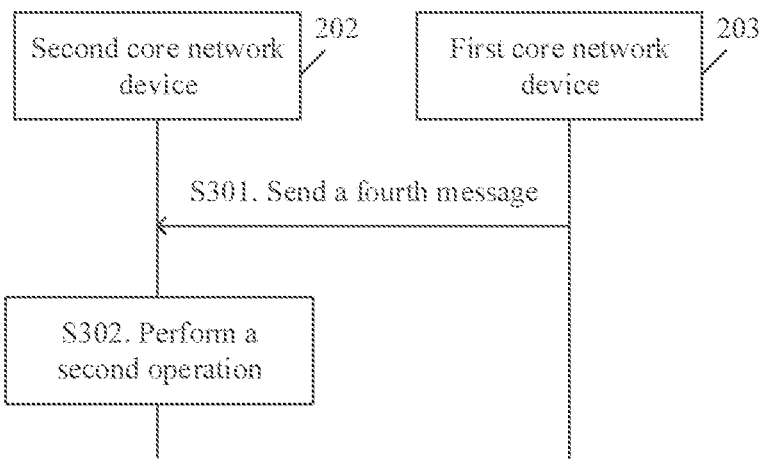
FIG. 3(a) is a schematic diagram of a network slice-based dynamic adjustment method for a—PDU session according to an embodiment of this application.
Figure 3B:
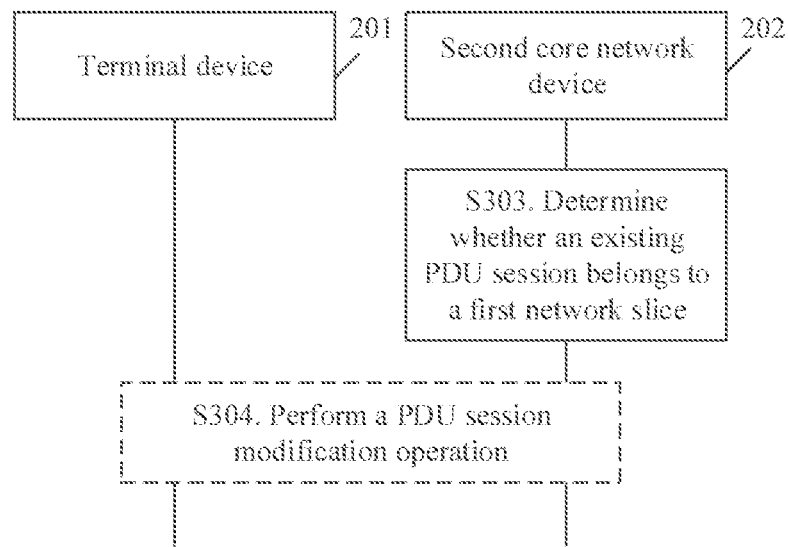
FIG. 3(b) is a schematic diagram of another network slice-based dynamic adjustment method for a PDU session according to an embodiment of this application.

Based on the foregoing embodiment, this application provides an embodiment of dynamically adjusting a PDU session when first information is used to indicate a network slice. As shown in FIG. 3(a), the specific method is as follows:

S301. The first core network device 203 sends a fourth message to the second core network device 202. When the third message is used to configure only the second parameter, the first core network device sends the fourth message to the second core network device to indicate the second core network device to dynamically adjust the PDU session.

The fourth message is used to indicate information about a first slice, and the fourth message carries at least one of first slice information and a first time period. Specifically, network slice information may include single network slice selection assistance information (Single Network Slice Selection Assistance Information, S-NSSAI). For example, if the fourth message carries the first time period and the first slice information, the first time period may be determined by the first server 204. Assuming that the first lime period is 10:00 to 14:00, and the first slice information is S-NSSAI, statistics on a network resource utilization status of a network slice whose identifier is S-NSSAI in the time period are collected.

S302. The second core network device 202 performs a first operation based on the fourth message.

When the terminal device 201 is in a tracking area TA 1 and in the first time period, the PDU session exists, and the following steps are performed. The specific method includes:

S303. The second core network device 202 determines whether an existing PDU session belongs to a first network slice.

For example, if S-NSSAI 1 exists in the PDU session and S-NSSAI of the first network slice currently accessed by the terminal device 201 is also S-NSSAI 1, the second core network device 202 determines that the existing PDU session belongs to the first network slice. When the existing PDU session belongs to the first network slice, the existing PDU session is retained. When the existing PDU session does not belong to the first network slice, step S304 is performed.

S304. Perform a PDU session modification procedure.

Specifically, the PDU session modification procedure may include release, modification, deletion, and the like, as described in the standard 3GPP TS 23.502. Details are not described herein again.

According to the foregoing embodiment, when the second core network device 202 is an AMF, and the first network slice is a network slice A, as shown in steps S408 and S409 in FIG. 4A and FIG. 4B.

S408. The AMF 402 determines, based on network slice information of the existing PDU session, whether the PDU session belongs to the network slice A, and if the PDU session belongs to the network slice A, retains the PDU session, or if the PDU session does not belong to the network slice A, releases the PDU session, and performs step S409.

Specifically, when S-NSSAI stored in the PDU session is the same as the S-NSSAI in the network slice A, the PDU session belongs to the network slice A.

S409. Perform a PDU session modification operation.

The PDU session modification operation includes activation, release, and the like. For example, the second parameter 5QI in the foregoing embodiment replaces the 5QI in the existing PDU session.

Figure 3C:
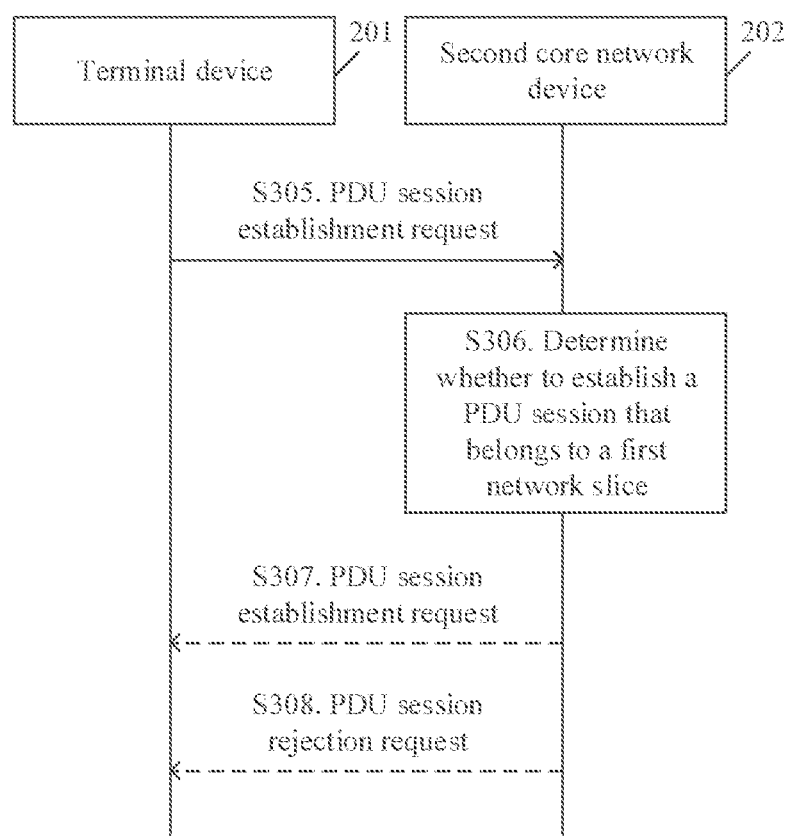
FIG. 3(c) is a schematic diagram of still another network slice-based dynamic adjustment method for a PDU session according to an embodiment of this application.

When the PDU session docs not exist, the first operation is shown in FIG. 3(c). The specific method includes:

S305. The terminal device 201 sends a PDU session establishment request to the second core network device.

S306. The second core network device 202 determines whether to establish a PDU session that belongs to the first network slice.

When it is determined to establish a PDU session that belongs to the first network slice, step S307 is performed. When determining not to establish a new PDU session, the second core network device 202 performs step S308.

S307. Perform a PDU session establishment procedure. Specifically, the PDU session establishment procedure is as described in the standard 3GPP TS 23.502, and details are not described herein again.

S308. The second core network device 202 sends a PDU session rejection message to the terminal device 201.

In step S308, the PDU session rejection message may carry a first cause value, or may carry first time information. Specifically, the first cause value is used to indicate a rejection cause. For example, "0" represents "information mismatch". The first time information is used to indicate a time at which a PDU session establishment request may be sent next time when the current PDU session establishment request is rejected. The first time information may be a time point or a time period.

For example, the byte "01" is used to represent 20 s in the first time information. After 20 s, the terminal device sends a PDU session establishment request to the AMF.

When the second core network device 202 is an AMF, as shown in steps S409 to S412b in FIG. 4A and FIG. 4B, the following step is performed:

S409. Perform a PDU session modification operation.

The PDU session modification operation includes activation, release, and the like. A specific operation method is the same as that in the standard 3GPP TS 23.501, and details are not described herein again.

In some other embodiments, when the terminal device is located in the tracking area TA 1 and in the first time period, a new PDU session needs to be established, and the following steps are performed:

S410. The terminal device 401 sends a PDU session establishment request to the AMF 402.

S411. The AMF 402 determines, based on the information about the network slice A, whether to establish a PDU session; and if the PDU session is to be established, performs step S412a; or if the PDU session is not to be established, rejects the establishment request, and performs step S412b.

S412a. The AMF 402 sends a PDU session acceptance request to the terminal device.

S412b. The AMF 402 sends a PDU session rejection request to the terminal device 401.

Through the foregoing embodiment, the terminal device 401 dynamically adjusts access of the PDU session based on the information about the network slice and the current network resource status of the terminal device 401, to ensure that the current network slice can preferentially access a network and use a good network resource.

Figure 5A:
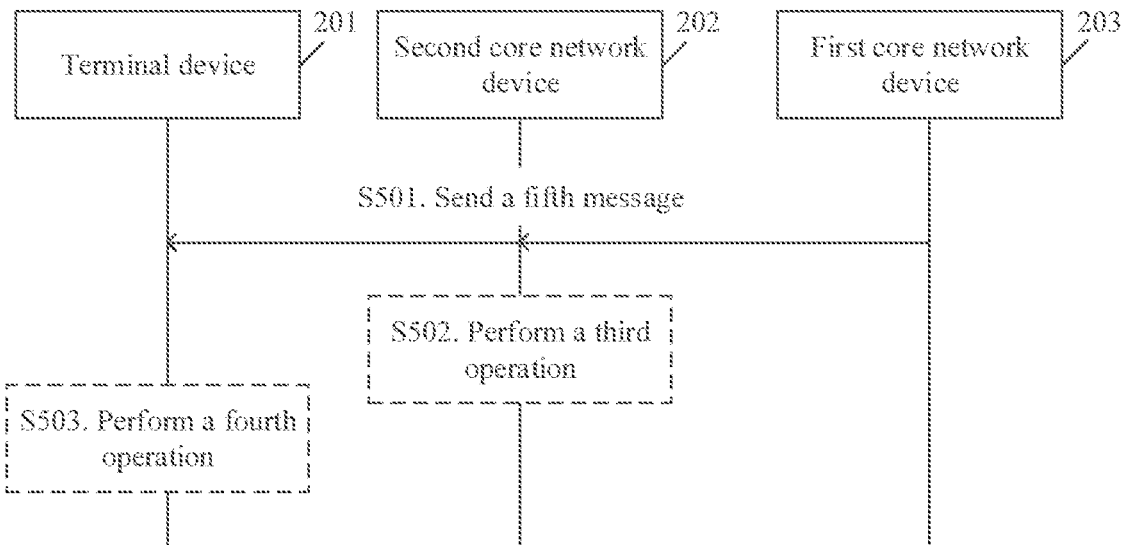
FIG. 5(a) is a schematic diagram of an application-based dynamic adjustment method for a PDU session according to an embodiment of this application.

Based on the foregoing embodiment, FIG. 5 shows an embodiment of dynamically adjusting a PDU session when first information is used to indicate application information according to this application. As shown in FIG. 5(a), the specific method is as follows:

S501. The first core network device 203 sends a fifth message to the second core network device 202.

The fifth message carries at least one of a first application identifier and a second time period.

Further, when a PDU session exists at the current location of the terminal device 201 in the second time period, step S502 is performed.

S502. The second core network device 202 performs a second operation based on the fifth message.

Further, a first application transmits data at the current location of the terminal device 201 in the second time period, and step S503 is performed.

S503. The terminal device 201 performs a third operation based on the fifth message.

Figure 6A:
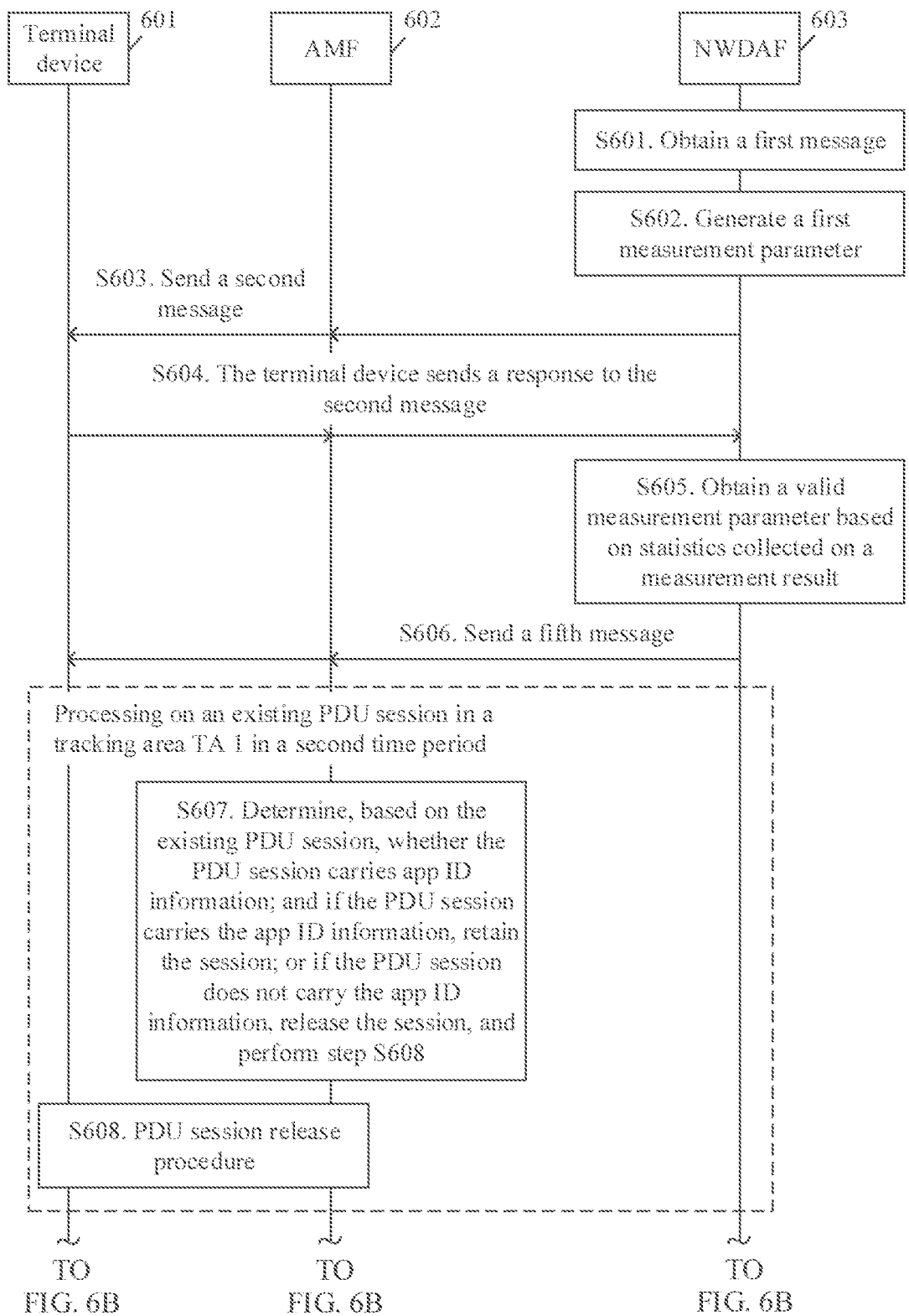
FIG. 6A and FIG. 6B are a schematic diagram of an application-based dynamic adjustment method for a PDU session according to an embodiment of this application.
Figure 6B:
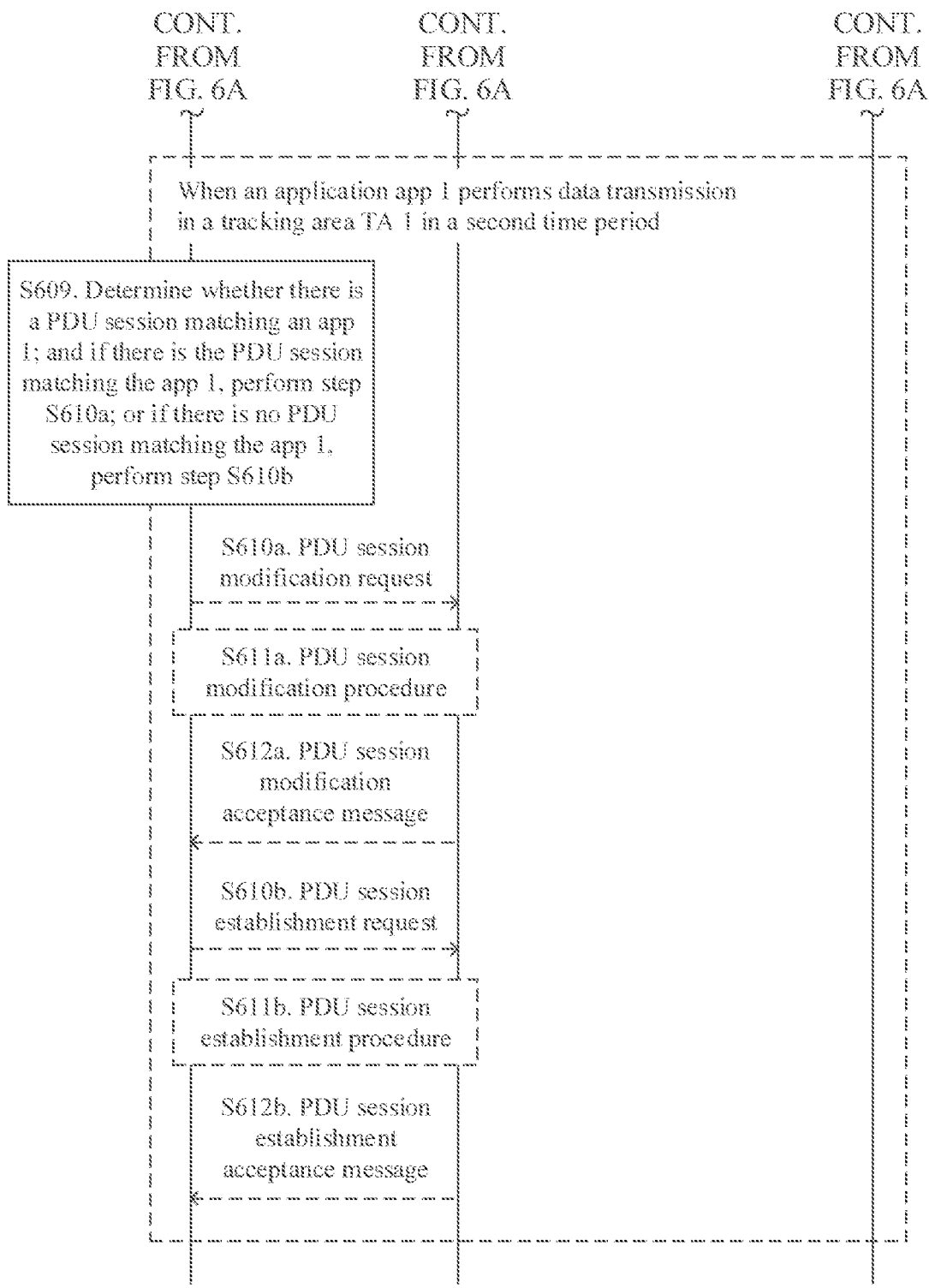

With reference to steps S501 to S503 in the foregoing embodiment, when the first core network device 203 is an NWDAF, and the second core network device 202 is an AMF, as shown in steps S601 to S606 in FIG. 6A and FIG. 6B, the specific method is as follows:

S601. The NWDAF 603 obtains a first message.

The first message is used to indicate a network resource utilization status of an application app 1. Specifically, the NWDAF obtains, from an application server, a quantity of terminal devices that are accessed by the application app 1 in the location area A or the time period A. The first message is used to indicate a network resource utilization status in the area, and is used to ensure that the application app 1 can preferentially access a network and use a good network resource.

S602. The NWDAF 603 generates a first parameter based on the first message.

The first parameter is the same as the description in step S202, and details are not described herein again.

S603. The NWDAF 603 sends a second message to the AMF 602.

The second message is the same as the description in step S203, and details are not described herein again.

S604. The terminal device sends a response to the second message.

The response to the second message is the same as the description in step S404, and details are not described herein again.

S605. The NWDAF 603 obtains a second parameter based on a measurement result.

S606. The NWDAF 603 sends a fifth message to the AMF.

Figure 5B:
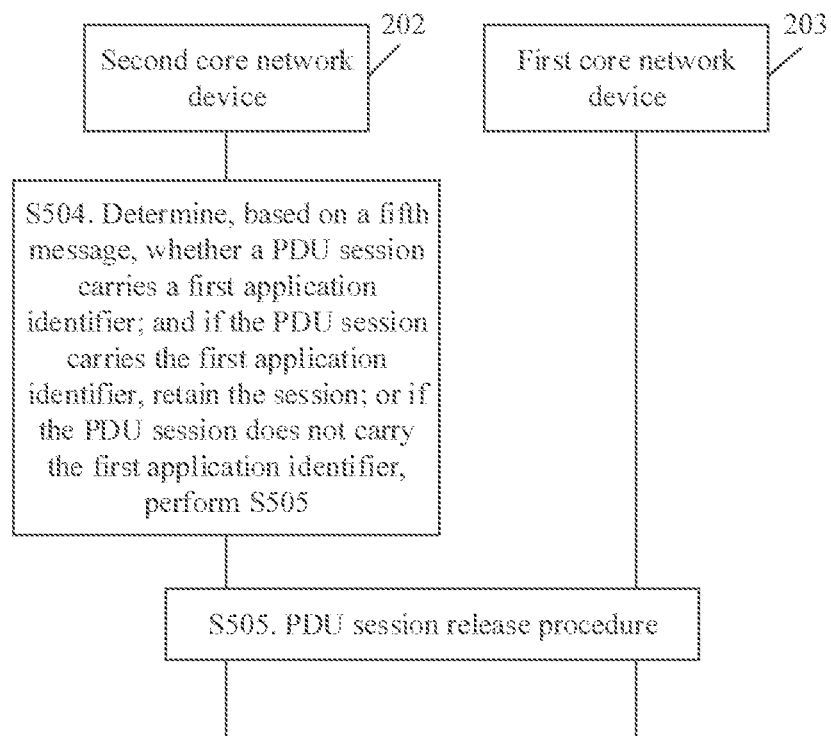
FIG. 5(b) is a schematic diagram of another application-based dynamic adjustment method for a PDU session according to an embodiment of this application.

The fifth message is used to indicate that when the terminal device is located in the tracking area TA 1, the PDU session corresponding to the application app 1 in the second time period carries an application identifier app 1 ID. Specifically, in some embodiments of this application, the app 1 ID may be a uniform resource locator (Uniform Resource Locator, URL), for example, the app 1 ID may be "dev/application/app 1". This is not limited in this application. In some embodiments, the second operation is shown in FIG. 5(b), and specific steps include:

S504. The second core network device 202 determines, based on the fifth message, whether the PDU session carries a first application identifier; and if the PDU session carries Use first application identifier, retains the session; or if the PDU session does not carry the first application identifier, performs step S505.

S505. Perform a PDU session release procedure.

Step S505 is the same as that described in the standard 3GPP TS23.501, and details are not described herein again.

Figure 5C:
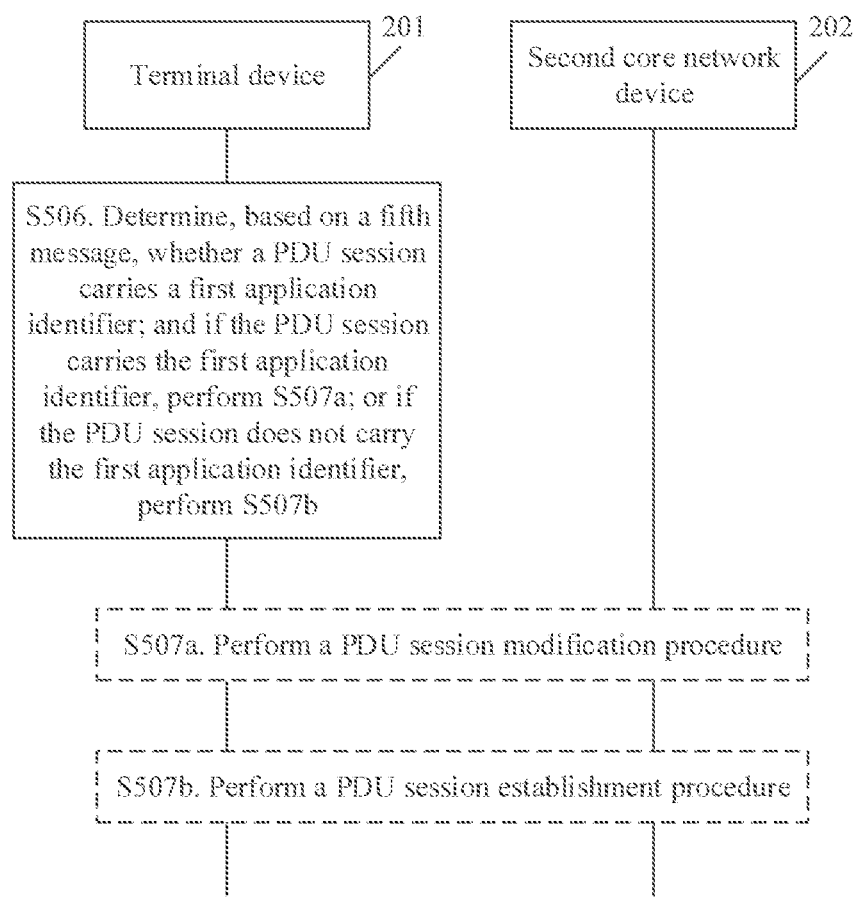
FIG. 5(c) is a schematic diagram of still another application-based dynamic adjustment method for a PDU session according to an embodiment of this application.

In some embodiments, a third operation is shown in FIG. 5(c), and the specific method includes:

S503. The terminal device determines, based on the fifth message, whether the PDU session carries a first application identifier, and if the PDU session carries the first application identifier, performs step S504a, or if the PDU session does not carry the first application identifier, performs step S504b.

S504a. Perform a PDU session modification procedure.

S504b. Perform a PDU session establishment procedure.

Step S504a and step S504b are the same as those described in the standard 3GPP TS23.501, and details are not described herein again.

With reference to the foregoing embodiment, when the first core network device 203 is an NWDAF, and the second core network device 202 is an AMF, as shown in steps S607 to S612b in FIG. 6A and FIG. 6B, the specific method is as follows. In this case, when the terminal device is located in the tracking area TA 1 and in the second time period, the PDU session exists.

S607. The AMF determines, based on the existing PDU session, whether the PDU session carries an identifier app 1 ID of the application app 1, and if the PDU session carries the identifier app 1 ID, retains the session: or if the PDU session does not carry the identifier app 1 ID, performs step S608.

S608. Perform a PDU session release procedure.

The PDU session release procedure is the same as that described in the standard 3GPP TS 23.501. Details are not described herein again.

When the terminal device is in the tracking area TA 1 and in the second time period, the application app 1 performs data transmission, and the following steps are performed:

S609. The terminal device 601 determines whether there is a PDU session that matches the application app 1, and if there is a PDU session that matches the application app 1, performs step S610a.

S610a. The terminal device 601 sends a session modification request to the AMF 602.

The PDU session modification request carries an application identifier app 1 ID.

S611a. Perform a PDU session modification procedure.

In the PDU session modification procedure, the application identifier app 1 ID carried in the PDU session request is added to the PDU session.

S612a. The AMF 602 sends a PDU session modification acceptance message.

Specifically, after the PDU session is modified completely, the AMF sends a PDU session modification acceptance message to the terminal device, to indicate that the PDU session has been modified completely.

When determining that there is no PDU session matching the application app 1, the terminal device performs step S610b.

S610b. The terminal device 601 sends a PDU session establishment request.

The PDU session establishment request carries an application identifier app 1 ID.

S611b. Perform a PDU session establishment procedure.

Further, in the PDU session establishment procedure, the application identifier app 1 ID carried in the PDU session establishment request is added to the newly established PDU session.

S612b. The AMF 602 sends a PDU session establishment acceptance message.

After the PDU session is established, the AMF sends a PDU session establishment acceptance message to the terminal device, to indicate that the PDU session has been established.

The foregoing steps S611a and S612a are the same as those described in the standard 3GPP TS23.501, and details are not described herein again.

Figure 7:
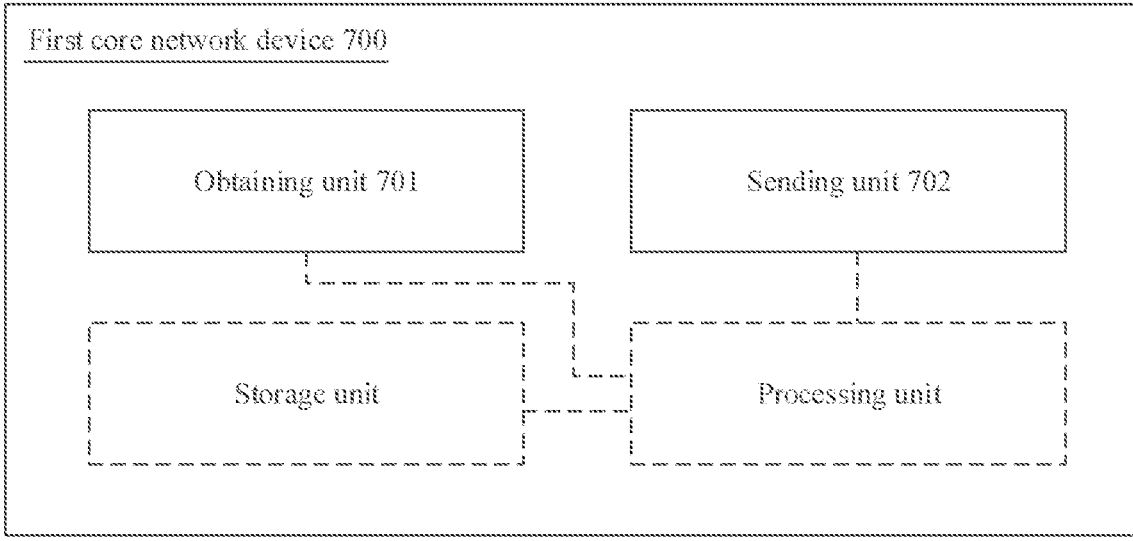
FIG. 7 is a schematic structural diagram of a first core network device according to an embodiment of this application.

FIG. 7 shows a first core network device in a dynamic adjustment method for a PDU session according to this application. As shown in FIG. 7, the first core network device 700 includes an obtaining unit 701 and a sending unit 702. The obtaining unit 701 is configured to obtain a first message sent by a first server, and obtain a first parameter based on the first message. The sending unit 702 is configured to send a second message to a second core network device. The second message has been described in the foregoing embodiment, and details are not described herein again.

Further, the sending unit further sends a third message to the second core network device, where the third message is used to indicate the second core network device to configure a second parameter. In this embodiment, the second parameter may be a QoS-related parameter. For example, the second parameter is 5QI.

Optionally, when the first message is used to indicate a network resource status of a first slice, the sending unit sends a fourth message to the second core network device, where the fourth message carries at least one of first slice information and first time period information. In this embodiment of this application, the first slice information includes S-NS-SAI(s). The first time period information may be determined by the first server.

Optionally, when the first message is used to indicate a network resource status of a first application, the sending unit sends a fifth message to a third core network device, where the fifth message carries at least one of a first application identifier and a second lime period.

In addition, in this embodiment of this application, the second core network device may further include a processing unit and a storage unit. The processing unit is configured to perform corresponding data processing, and the storage unit is configured to store a corresponding instruction and data.

Figure 8:
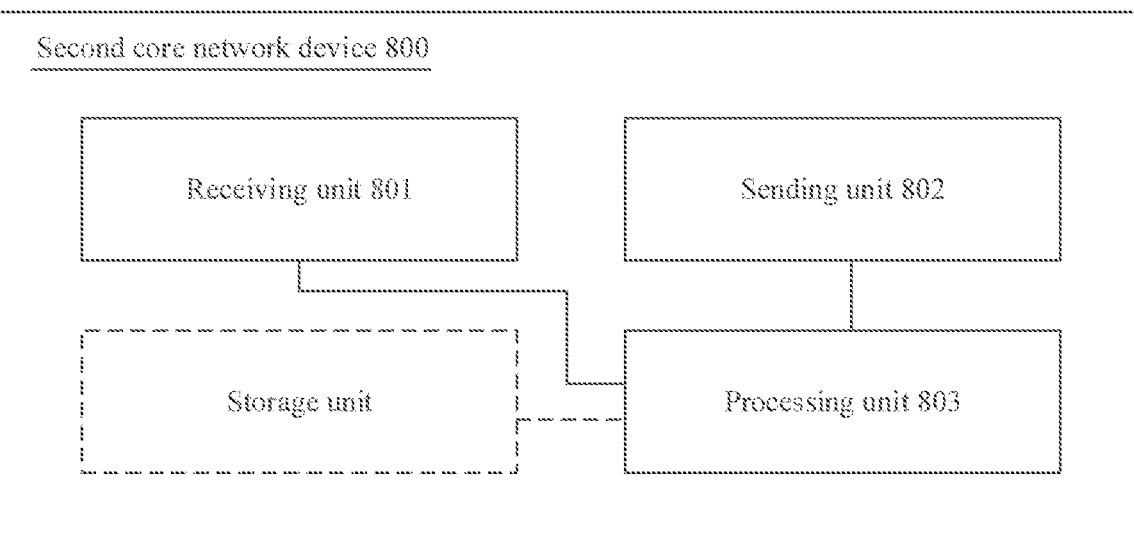
FIG. 8 is a schematic structural diagram of a second core network device according to an embodiment of this application.

FIG. 8 shows a second core network device in a dynamic adjustment method for a PDU session according to an embodiment of this application. As shown in FIG. 8, the second core network device 800 includes an obtaining unit 801, a sending unit 802, and a processing unit 803. The obtaining unit 801 is configured to obtain a second message sent by a first core network device and obtain a measurement result sent by a terminal device. Further, the obtaining unit 801 is further configured to obtain a third message, where the third message is used to indicate the second core network device to configure a second parameter. The sending unit 802 is configured to send the second message to the terminal device and send the measurement result to the first core network device.

In some embodiments of this application, when the first message is used to indicate a network resource of a first slice, the obtaining unit 801 may obtain a fourth message. The processing unit 803 may perform a first operation based on the fourth message. Specifically, when a PDU session exists, the processing unit 803 retains the PDU session when determining that the PDU session belongs to the first slice, or the processing unit 803 releases the PDU session when determining that the PDU session does not belong to the first slice.

When a new PDU session needs to be established, the obtaining unit 801 obtains a PDU session establishment request sent by the terminal device, the processing unit 803 determines, based on first slice information, that the PDU session belongs to the first slice, and the sending unit 802 sends a PDU session reception request message to the terminal device. When the processing unit 803 determines that the PDU session does not belong to the first slice, the sending unit 802 sends a PDU session rejection request message to the terminal device, where the rejection request message carries a first cause value and first time information, the first cause value is used to indicate a cause for rejecting the PDU session, and the first time information is used to indicate a time at which a PDU session is established next time.

In some embodiments of this application, first information is used to indicate a network resource status of a first application, and the obtaining unit 801 obtains a fifth message sent by a third core network device. The fifth message is the same as the description in the foregoing embodiment, and details are not described herein again. The processing unit 803 performs a second operation.

When a PDU session exists, the second operation includes: The processing unit determines, based on the fifth message, that the PDU session carries a first application identifier, and retains the PDU session, or the processing unit determines, based on the fifth message, that the PDU session does not carry the first application identifier, and releases the PDU session.

In addition, in this embodiment of this application, the second core network device may further include a storage unit, and the storage unit is configured to store a corresponding instruction and data.

Figure 9:
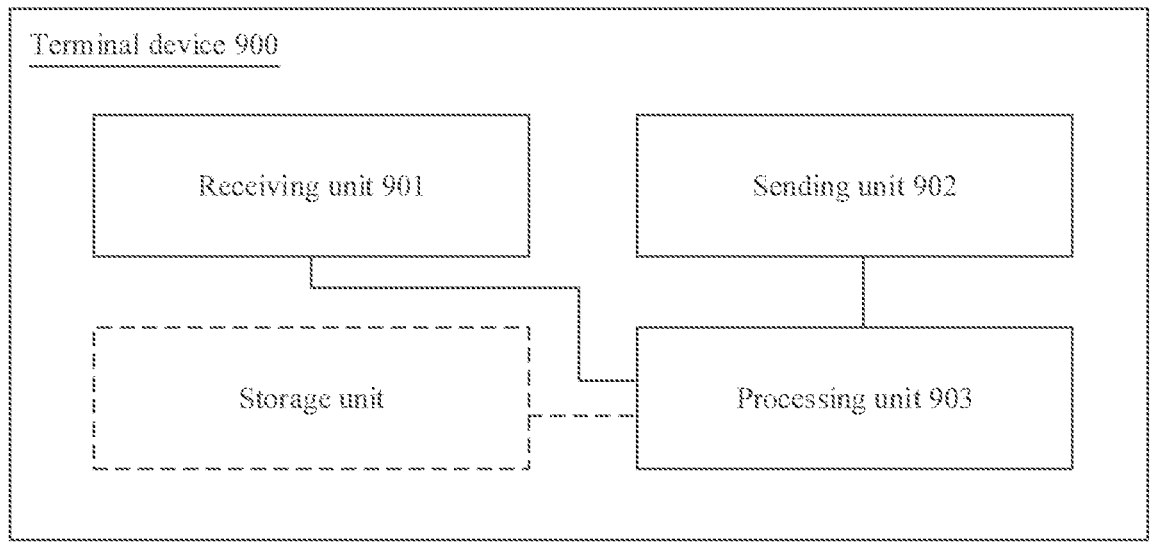
FIG. 9 is a schematic structural diagram of a terminal device according to an embodiment of this application.

FIG. 9 is a schematic diagram of a terminal device according to an embodiment of this application. As shown in FIG. 9, the terminal device 900 includes an obtaining unit 901, a sending unit 902, find a processing unit 903. The obtaining unit 901 is configured to obtain a second message sent by a second core network device. The sending unit 902 is configured to send a measurement result of a first parameter to the second core network device.

In some embodiments of this application, when a first message indicates the network resource status of a first application, the obtaining unit 901 obtains a fifth message sent by the second core network device. Specifically, when the first application transmits data and a PDU session exists, the processing unit 903 determines, based on the fifth message, that the PDU session matches a first application identifier, and the sending unit 902 sends a PDU session request message to the second core network device, where the PDU session modification request message carries the first application identifier. When the first application transmits data and the PDU session does not exist, the sending unit 901 sends a PDU session establishment request message to the second core network device, where the PDU session establishment request message carries the first application identifier.

In addition, in this embodiment of this application, the second core network device may further include a storage unit, and the storage unit is configured to store a corresponding instruction and data.

Figure 10:
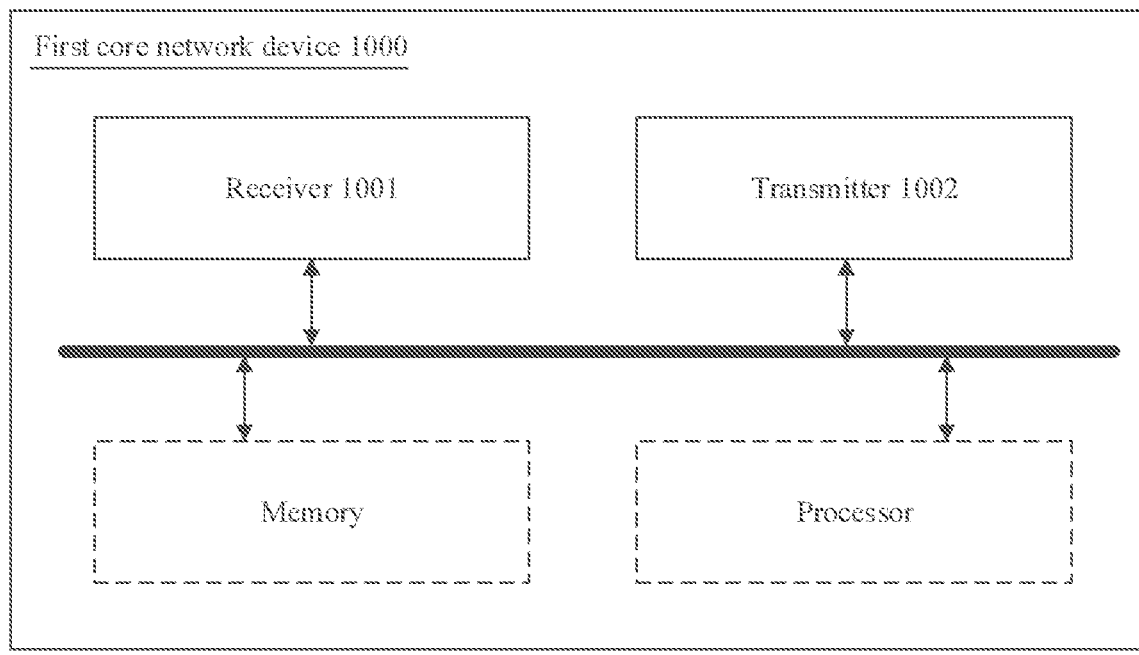
FIG. 10 is a schematic structural diagram of another first core network device according to an embodiment of this application.

FIG. 10 is a schematic, diagram of a first core network device according to an embodiment of this application. As shown in FIG. 10, the first core network device includes a receiver 1001 and a transmitter 1002.

The receiver 1001 obtains a first message sent by a first server and obtains a measurement result of a first parameter, and the transmitter 1002 sends a second message to a second core network device, where the second message carries first indication information, and is used to indicate a terminal device to collect statistics on the measurement result of the first parameter.

Further, the transmitter 1002 further sends a third message to the second core network device, where the third message carries a second parameter, and the second parameter is obtained by the terminal device through statistics collection based on the measurement result of the first parameter. The third message further indicates the second core network device to configure the second parameter.

In some embodiments of this application, when the first message indicates a first network resource status, the transmitter 1002 sends a fourth message to the second core network device, where the fourth message carries at least one of first slice information and a first time period.

In some other embodiments of this application, when the first message indicates a network resource status of a first application, the transmitter 1002 sends a fifth message to the second core network device, where the fifth message carries at least one of a first application identifier and a second time period.

In addition, in this embodiment of this application, the second core network device may further include a processor and a memory. The processor is configured to perform corresponding data processing, and the memory is configured to store a corresponding instruction and data.

Figure 11:
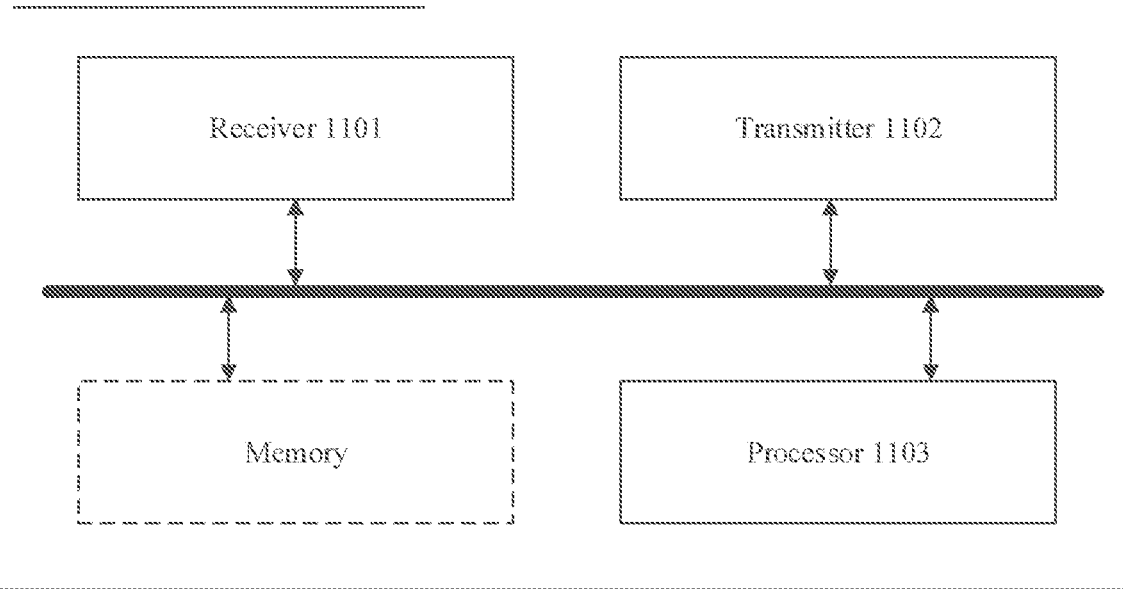
FIG. 11 is a schematic structural diagram of another second core network device according to an embodiment of this application.

FIG. 11 is a schematic diagram of a second core network device according to an embodiment of this application. As shown in FIG. 11, the second core network device includes a transmitter 1101, a receiver 1102, and a processor 1103. The receiver 1101 is configured to obtain a second message sent by a first core network device, and the second message carries a first parameter. The receiver 1101 is further configured to obtain a third message, where the third message indicates the second core network device to configure a second parameter.

In some embodiments of this application, when the first information is used to indicate a network resource status of a first slice, the receiver 1101 obtains a fourth message, where the fourth message carries at least one of first slice information and a first time period, and the processor 1103 performs a first operation based on the fourth message.

Further, when a PDU session exists, the first operation includes: The processor retains the PDU session when determining, based on the fourth message, that the PDU session belongs to the first slice, or the processor releases the PDU session when determining, based on the fourth message, that the PDU session does not belong to the first slice.

When a new PDU session needs to be established, the receiver 1101 obtains a PDU session establishment request sent by the terminal device, the processor 1103 determines that the PDU session belongs to the first slice, and the transmitter 1102 sends PDU session reception request information to the terminal device.

The processor 1103 determines that the PDU session does not belong to the first slice, and the transmitter 1101 sends a PDU session rejection request message to the terminal device, where the rejection request message carries a first cause value and first time information, the first cause value is used to indicate a cause for rejecting the PDU session, and the first time information is used to indicate a time at which a PDU session is established next time.

In some embodiments of this application, the first message is used to indicate a network resource status of a first application, and the receiver 1101 obtains a fifth message sent by a third core network device, where the fifth message carries at least one of a first application identifier and a second lime period. The processor 1103 performs a second operation.

When a PDU session exists, the second operation includes: The processor determines, based on the fifth message, that the PDU session carries the first application identifier, and retains the PDU session; and the processor determines, based on the fifth message, that the PDU session does not carry the first application identifier, and releases the PDU session.

In addition, in this embodiment of this application, the second core network device may further include a memory, and the memory is configured to store a corresponding instruction and data.

Figure 12:
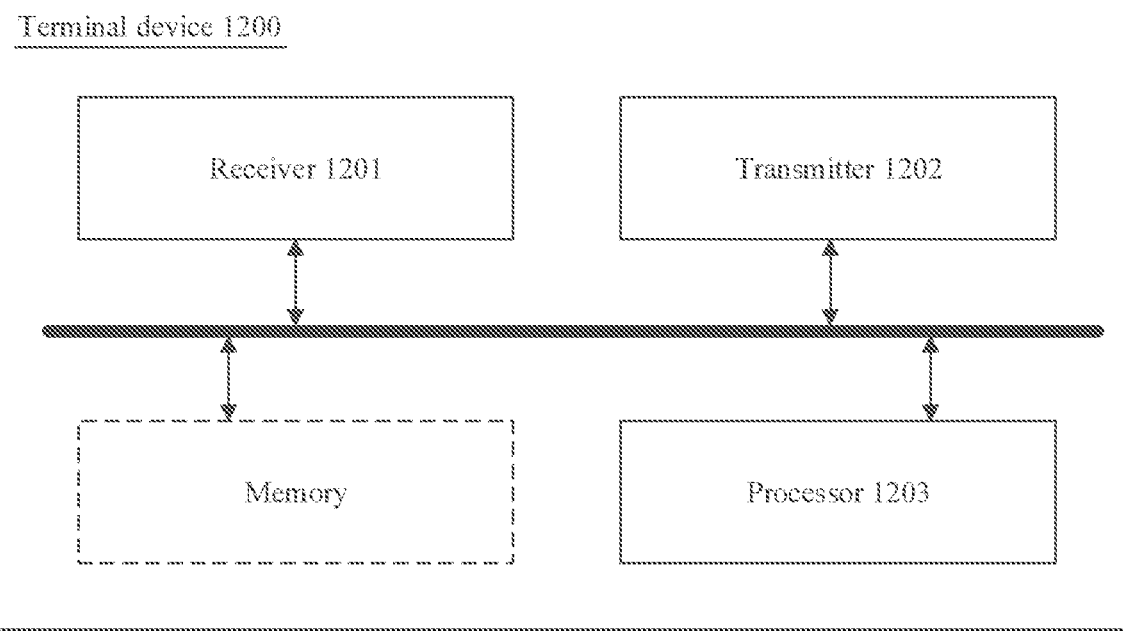
FIG. 12 is a schematic structural diagram of another terminal device according to an embodiment of this application.

FIG. 12 shows an embodiment of a terminal device according to this application. As shown in FIG. 12, the terminal device 1200 includes a receiver 1201, a receiver 1202, and a processor 1203. The receiver 1201 is configured to obtain a second message sent by a second core network device, where the second message carries a first parameter, and is used to indicate the terminal device to collect statistics on a measurement result of the first parameter. The transmitter 1202 is configured to send the measurement result of the first parameter to the second core network device.

In some embodiments of this application, when a first message indicates a network resource of a first application, the receiver 1201 obtains a fifth message sent by the second core network device, and the processor 1203 performs a third operation.

When the first application transmits data and a PDU session exists, the third operation includes: The processor 1203 determines, based on the fifth message, that the PDU session matches a first application identifier: and the transmitter 1202 sends a PDU session modification request message to the second core network device, where the PDU session request message carries the first application identifier.

When the first application transmits data and no PDU session exists, the third operation includes: The transmitter 1202 sends a PDU session establishment request message to the second core network device, where the PDU session establishment request message carries a first application identifier.

In addition, in this embodiment of this application, the second core network device may further include a memory, and the memory is configured to store a corresponding instruction and data.

An embodiment of this application further provides a computer program product. The computer program product includes a computer software instruction, where the computer software instruction may be loaded by using a processor to implement the method in the foregoing method embodiments.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

This application is described with reference to the flowcharts and/or block diagrams of the method, the apparatus (device), and the computer program product according to the embodiments of this application. It should be understood dial computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

A person skilled in the art should be aware that in the foregoing one or more examples, functions described in this application may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing description is merely specific implementations of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for adjusting a protocol data unit (PDU) session comprising:
   obtaining, by a second core network device, a first message from a first core network device, wherein the first message comprises a first parameter and a network resource status of a first application;

sending the first message to a terminal device to instruct the terminal device to obtain a measurement result of the first parameter;
obtaining the measurement result from the terminal device;
sending the measurement result to the first core network device;
obtaining a second message to instruct the second core network device to configure, based on the measurement result, a second parameter to adjust the PDU session;
obtaining a fourth message from a third core network device, wherein the fourth message comprises at least one of a first application identifier or a second time period; and
retaining the PDU session when the fourth message includes the first application identifier.

2. The method of claim 1, wherein when the first message indicates a network resource status of a first slice, the method further comprises:
obtaining a third message that comprises at least one of first slice information or a first time period; and
performing, in response to the third message, a first operation comprising:
retaining the PDU session when the PDU session belongs to the first slice; and
releasing the PDU when the PDU session does not belong to the first slice.

3. The method of claim 2, further comprising identifying that the PDU session exists, and wherein the first operation comprises retaining the PDU session when the PDU session belongs to the first slice.

4. The method of claim 2, further comprising:
obtaining a PDU session establishment request from the terminal device; and
sending, in response to the PDU session establishment request, a PDU session reception request message to the terminal device when the PDU session belongs to the first slice.

5. The method of claim 4, further comprising sending, when the PDU session does not belong to the first slice, in a PDU session rejection request message to the terminal device, wherein the PDU session rejection request message comprises a first cause value and first time information, wherein the first cause value indicates a cause for rejecting the PDU session, and wherein the first time information indicates a next time when the PDU session can be established.

6. The method of claim 2, further comprising identifying that the PDU session exists, and wherein the first operation comprises
releasing the PDU session when the PDU session does not belong to the first slice.

7. The method of claim 1, wherein the second parameter comprises one or more of an air interface measurement or a quality of service (QoS)-related parameter.

8. The method of claim 1, further comprising
releasing the PDU session when the fourth message does not carry the first application identifier.

9. The method of claim 1, wherein the first parameter comprises one or more of an air interface measurement or a quality of service (QoS)-related parameter.

10. The method of claim 1, wherein the second parameter comprises a 5G QoS indicator (5QI).

11. A method for a protocol data unit (PDU) session comprising:
obtaining, by a terminal device, from a core network device, a first message comprising a first parameter, wherein the first message instructs the terminal device to obtain a measurement result of the first parameter, wherein the measurement result comprises statistical information related to a PDU session, and wherein the first message further indicates a network resource status of a first application;
obtaining, from the core network device, a second message comprising a second time period; and
sending the measurement result to the core network device.

12. The method of claim 11, wherein the second message further comprises first application information comprising a first application identifier.

13. The method of claim 12, wherein the first application is configured to transmit data, wherein the method further comprises performing a first operation when the PDU session exists, and wherein the first operation comprises sending, to the core network device, a PDU session modification request message comprising the first application identifier when the PDU session matches the first application identifier.

14. The method of claim 12, wherein the first application is configured to transmit data, wherein the method further comprises performing a second operation when the PDU session does not exist, wherein the second operation comprises sending a PDU session establishment request message comprising a first application identifier to the core network device.

15. The method of claim 11, wherein the first parameter comprises one or more of an air interface measurement or a quality of service (QoS)-related parameter.

16. A terminal device for a protocol data unit (PDU) session-comprising:
a receiver configured to obtain, from a core network device, a first message comprising:
a network resource status of a first application, wherein the first application is configured to transmit data; and
a first parameter, wherein the first message instructs the terminal device to collect statistics on a measurement result of the first parameter, wherein the measurement result comprises statistical information related to the PDU session, wherein the receiver is further configured to obtain a second message from the core network device, and wherein the second message comprises first application information;
a transmitter coupled to the receiver and configured to send the measurement result to the core network device; and
a processor configured to perform a first operation when the PDU session does not exist, and wherein the first operation is configured to cause the transmitter to send, to the core network device, a PDU session establishment request message comprising a first application identifier.

17. The terminal device of claim 16, wherein the terminal device further comprises a processor coupled to the receiver and the transmitter and configured to perform a first operation comprising:
retaining the PDU session when the PDU session belongs to a first slice; and
releasing the PDU when the PDU session does not belong to a first slice.

18. The terminal device of claim 16, wherein the first application is configured to transmit data, wherein the processor is further configured to perform the first operation when the PDU session exists, and wherein the first operation is configured to cause the transmitter to send, to the core network device, a PDU session modification request message comprising the first application identifier when the PDU session matches the first application identifier.

19. The terminal device of claim 16, wherein the first message further indicates a network resource status of a first application, wherein the receiver is further configured to obtain a second message from the core network device, wherein the second message comprises a time period, and wherein the terminal device further comprises a processor coupled to the receiver and the transmitter and configured to perform a first operation comprising:

retaining the PDU session when the PDU session belongs to a first slice; and releasing the PDU when the PDU session does not belong to a first slice.

20. The method of claim 16, wherein the first parameter comprises one or more of an air interface measurement or a quality of service (QoS)-related parameter.

\* \* \* \* \*

UNITED STATES PATENT AND TRADEMARK OFFICE
CERTIFICATE OF CORRECTION

| | |
|---|---|
| PATENT NO. | : 11,903,073 B2 |
| APPLICATION NO. | : 17/289085 |
| DATED | : February 13, 2024 |
| INVENTOR(S) | : Xiaojuan Li and Guowei Ouyang |

It is certified that error appears in the above-identified patent and that said Letters Patent is hereby corrected as shown below:

In the Claims

Claim 5, Column 23, Line 40: "when the PDU session does not belong to the first slice, in" should read "when the PDU session does not belong to the first slice,"

Signed and Sealed this
Second Day of April, 2024

Katherine Kelly Vidal
*Director of the United States Patent and Trademark Office*